US00RE35047E

United States Patent [19]

Potter

[11] E Patent Number: Re. 35,047

[45] Reissued Date of Patent: Oct. 3, 1995

[54] SIDE-SLIDING STORAGE RACK FOR 3480 CARTRIDGES

[75] Inventor: Frank Potter, Syosset, N.Y.

[73] Assignee: Wright Line, Inc., Worcester, Mass.

[21] Appl. No.: 145,845

[22] Filed: Nov. 1, 1993

Related U.S. Patent Documents

Reissue of:

[64] Patent No.: 5,062,535
Issued: Nov. 5, 1991
Appl. No.: 656,215
Filed: Feb. 15, 1991

[51] Int. Cl.[6] ..... A47F 5/00

[52] U.S. Cl. ..... 211/162; 211/41; 211/94; 312/201

[58] Field of Search ..... 211/162, 94, 41, 211/40, 126; 312/201, 198, 246

[56] References Cited

U.S. PATENT DOCUMENTS

| | | | |
|---|---|---|---|
| D. 300,287 | 3/1989 | Price et al. | D6/407 |
| D. 300,288 | 3/1989 | Price et al. | D6/407 |
| 318,463 | 5/1885 | Garsed . | |
| 1,194,991 | 8/1916 | Gervais . | |
| 2,098,828 | 11/1937 | Ludwick | 211/34 |
| 2,166,704 | 7/1939 | Foulkes . | |
| 2,633,810 | 4/1953 | Freeman | 104/121 |
| 2,690,136 | 9/1954 | Freeman | 104/121 |
| 2,707,442 | 5/1955 | Ingold . | |
| 2,769,196 | 11/1956 | Guilbert, Jr. et al. | 16/85 |
| 2,772,639 | 12/1956 | Ingold . | |
| 3,503,471 | 3/1970 | Balke | 188/57 |
| 3,610,372 | 10/1971 | Warren . | |
| 3,881,585 | 5/1975 | Coleman et al. | 193/35 A |
| 4,182,440 | 1/1980 | Juergens | 193/35 A |
| 4,600,107 | 7/1986 | Price et al. | 211/41 |
| 4,616,888 | 10/1986 | Peterman . | |
| 4,616,889 | 10/1986 | Peterman | 312/201 |
| 4,688,682 | 8/1987 | Price et al. | 211/41 |
| 4,745,516 | 5/1988 | Griffin | 361/189 |
| 4,759,676 | 6/1988 | Hammond | 414/276 |
| 4,782,958 | 11/1988 | Price et al. | 211/41 |
| 4,815,795 | 3/1989 | Accumanno et al. | 312/12 |
| 4,844,564 | 7/1989 | Price, Sr. et al. | 312/12 |
| 4,846,355 | 7/1989 | Price, Sr. et al. | 211/41 |
| 4,898,283 | 2/1990 | Kingsford | 211/57.1 |
| 4,898,284 | 2/1990 | Arens | 211/162 |
| 4,971,199 | 11/1990 | Price, Jr. et al. | 206/387 |
| 4,982,852 | 1/1991 | Johansen | 211/162 |
| 5,072,838 | 12/1991 | Price, Jr. et al. | 211/162 |

FOREIGN PATENT DOCUMENTS 222834 1/1962 Austria .

OTHER PUBLICATIONS

Transcript of deposition of A. Patricia Pruden, May 25, 1994.

Photographs of shelving system installation of Supreme Equipment & Systems Corp., Wright Line Exhibits 183A–P, inclusive.

(List continued on next page.)

*Primary Examiner*—Robert W. Gibson
*Attorney, Agent, or Firm*—Quarles & Brady

[57] ABSTRACT

In accordance with the invention, cartridge storage racks are subject to being arranged end-to-end and back-to-back in stationary rows; and, adapted to be mounted to slide alongside the front of each row are similar racks. The number of stationary racks, without disturbing existing racks, may be extended to the extent of room space; and track elements may be added as needed to the extent of the rows of stationary racks for sliding thereon additional slide racks. The slide racks are subject to sliding relative to the stationary racks in such manner as not to block full access of an individual to the stationary racks; and means is provided whereby the slide racks are subject to being braked against over-travel relative to the stationary racks.

The questions raised in reexamination request No. 90/003, 277, filed Dec. 10, 1993, have been considered and the results thereof are reflected in this reissue patent which constitutes the reexamination certificate required by 35 U.S.C. 307 as provided in 37 CFR 1.570(e).

9 Claims, 3 Drawing Sheets

OTHER PUBLICATIONS

Sketch, Wright Line Exhibit 184.
Transcript of deposition of Henry L. Pryor, Jun. 3, 1994.
Supreme Equipment & Systems Corp., "Roll–A–Way Thinline Assembly Instructions", Jul. 1977, Wright Line Exhibit 189.
Supreme Equipment & Systems Corp., "Assembly Instructions roll–away thinline® bi–file tri–file", 1987, Wright Line Exhibit 190.
Supreme Equipment & Systems Corp. Price List TL–183, 1983, Wright Line Exhibit 194.
The Winsted Corporation, 1985 Winsted Matchmaker Systems catalog, front cover and pp. 67, 74 and 75.
Photographs of shelving system installation of Supreme Equipment & Systems Corp., Wright Line Exhibits 183A–F, 183J, 183M, 183N and 183P.
Supreme Equipment & Systems Corp., "Roll–A–Way Thinline Assembly Instructions", Jul. 1977, Wright Line Exhibit 189.
Supreme Equipment & Systems Corp., "Assembly Instructions roll–away thinline® bi–file™ tri–file™", 1987, Wright Line Exhibit 190.
EDP Brochure, 3480 Storage, Introducing The Quad Rac, 1989.
First EDP Drawing, 1989.
Second EDP Drawing, QUAD RAC, Instructional Assembly Material, 1989.
The Extend Brochure, The Spacemakers, May 25, 1990.

Denstor, Case Study No. 101, 1979.
Supreme Equipment & Systems Corp. Brochure, "Thin Line Roll–Away Bi–File/Tri File", 1980.
Supreme Equipment & Systems Corp. Brochure, "Roll–Away ThinLine® Bi–File/Tri–File", 1981.
Spacemakers, Inc. Drawing, May 13, 1982.
Denstor Mobile Storage Systems, Inc. Brochure, "Mobile Systems", 1985.
Stacor Corp. Price List No. 28/587, Effective May 15, 1987.
Spacemakers, Inc., "Video Cassette Storage Space Side–Step™ System", 1988.

FIG. 4
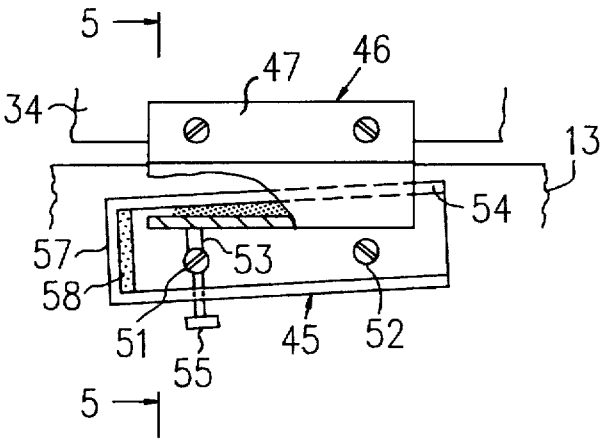
FIG. 5
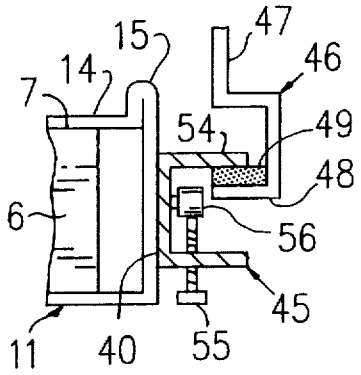
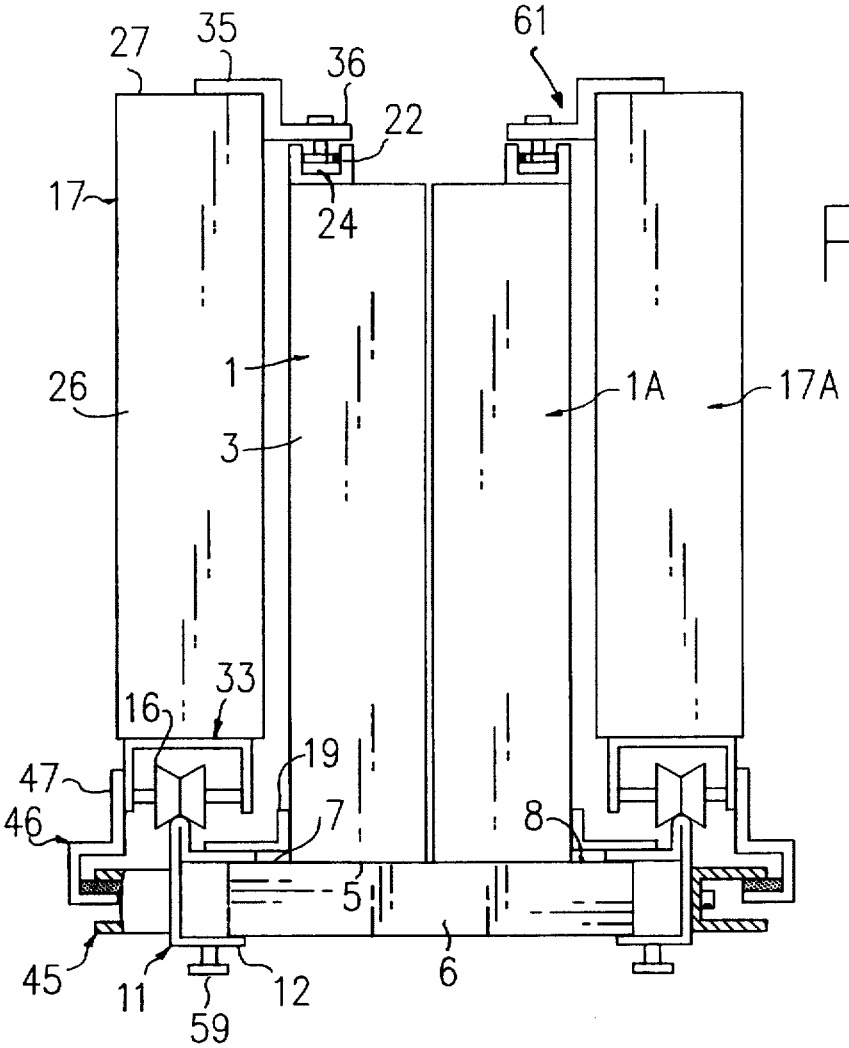
FIG. 3

SIDE-SLIDING STORAGE RACK FOR 3480 CARTRIDGES

Matter enclosed in heavy brackets [ ] appears in the original patent but forms no part of this reissue specification; matter printed in italics indicates the additions made by reissue.

BACKGROUND OF THE INVENTION

This invention is directed to improvements in data storage racks, such as used for the storage of computer cartridges. More particularly, the invention is directed to providing various individual units whereby an improved assembly of stationary data storage racks and associated relatively slidable data storage racks may be formed, and which assembly may be optionally extended by further employment of additional such units without disturbing the existing assembly.

With the advent of the computer cartridge the number of cartridges issuing daily has rapidly increased beyond expectations. Rooms loaded with racks in rows separated by access aisles have developed. However, the continued pouring out of new cartridges requires that some further means be provided for increasing the storage capacity of limited space and avoiding waste of space with excess aisles.

Accordingly, a general objective of this invention is to provide means enabling a material increase in the number of racks that may be placed in any particular room area and yet maintain aisles for access of workers to the various racks.

A more particular object of the invention is to provide various individual units which may be readily assembled together to obtain a row of stationary racks and relatively slidable racks, and to which assembly further units may be added to extend the assembly to include one or more of the stationary racks or slide racks.

Another object of the invention is to provide means for connecting multiple conventional racks in end-to-end relation, and to associate with the resulting row of racks one or more racks for sliding travel relative to the stationary racks.

A further object is to provide means whereby an existing conventional stationary rack may be converted into a slidable rack and slidably associated with a row of stationary racks.

And, another object of the invention is to provide an assembly of stationary and relatively slidable racks with brake means, whereby a slidable rack may be stopped against over-travel relative to the stationary racks smoothly and without bumping, disengagement or resulting shock to the assembly.

A feature of the invention is the provision of individual slide racks with roller elements, and individual roller track units which may be readily assembled to a row of stationary racks for sliding travel of the slide racks along the track units relative to the stationary racks.

A further feature is track rollers which may be added to a conventional stationary rack so as to convert the stationary rack into a slidable rack, and track means which may be added to a row of stationary racks to provide a continuous track engageable by the rollers whereby the slidable rack may ride along the track relative to the row of stationary racks.

Another feature is a brake unit comprising a stop member mountable to a lower area of a stationary rack and a padded member mountable to a lower area of a slide rack, which padded member is adapted to be brought into frictional engagement with the stop member so as to brake the slide rack against over-travelling movement relative to the stationary rack.

The foregoing and other objects, features and advantages of the invention will appear more fully hereinafter from a consideration of the accompanying description which follows, taken together with the accompanying drawings wherein an embodiment of the invention is illustrated. It is to be expressly understood, however, that the drawings are for purposes of illustration and description, and they are not to be construed as defining the limits of the invention.

BRIEF SUMMARY OF THE INVENTION

The invention comprises: roller means mountable to upper and lower areas of a conventional cartridge storage rack so as to convert the rack to a slide rack; means for connecting individual cartridge storage racks end-to-end in a row; track means mountable to upper and lower areas of the row of stationary racks to form continuous tracks with which roller elements of the roller means are engageable whereby the slide rack may slide along the tracks relative to the stationary racks; and a brake unit including a stop member mountable to a stationary rack and a padded member mountable to a slide rack, the padded member of which unit is adapted to obtain in the travel of the slide rack frictional engagement with the stop member and cause the slide rack to be braked against over-travel relative to the stationary racks.

The invention further includes an assembly of stationary racks; slide racks slidable relative to the stationary racks, and brake means arranged for stopping over-travel of a slide rack relative to the stationary racks, the assembly being formed from the components set forth above.

BRIEF DESCRIPTION OF THE DRAWINGS

In the accompanying drawings:

FIG. 3 is a right end view of FIG. 1;

FIG. 4 is a detail of the members of the brake unit in a braked condition; and FIG. 5 is an enlarged detail section on line 5—5 pf FIG. 4.

DETAILED DESCRIPTION OF THE INVENTION

Figure 1:
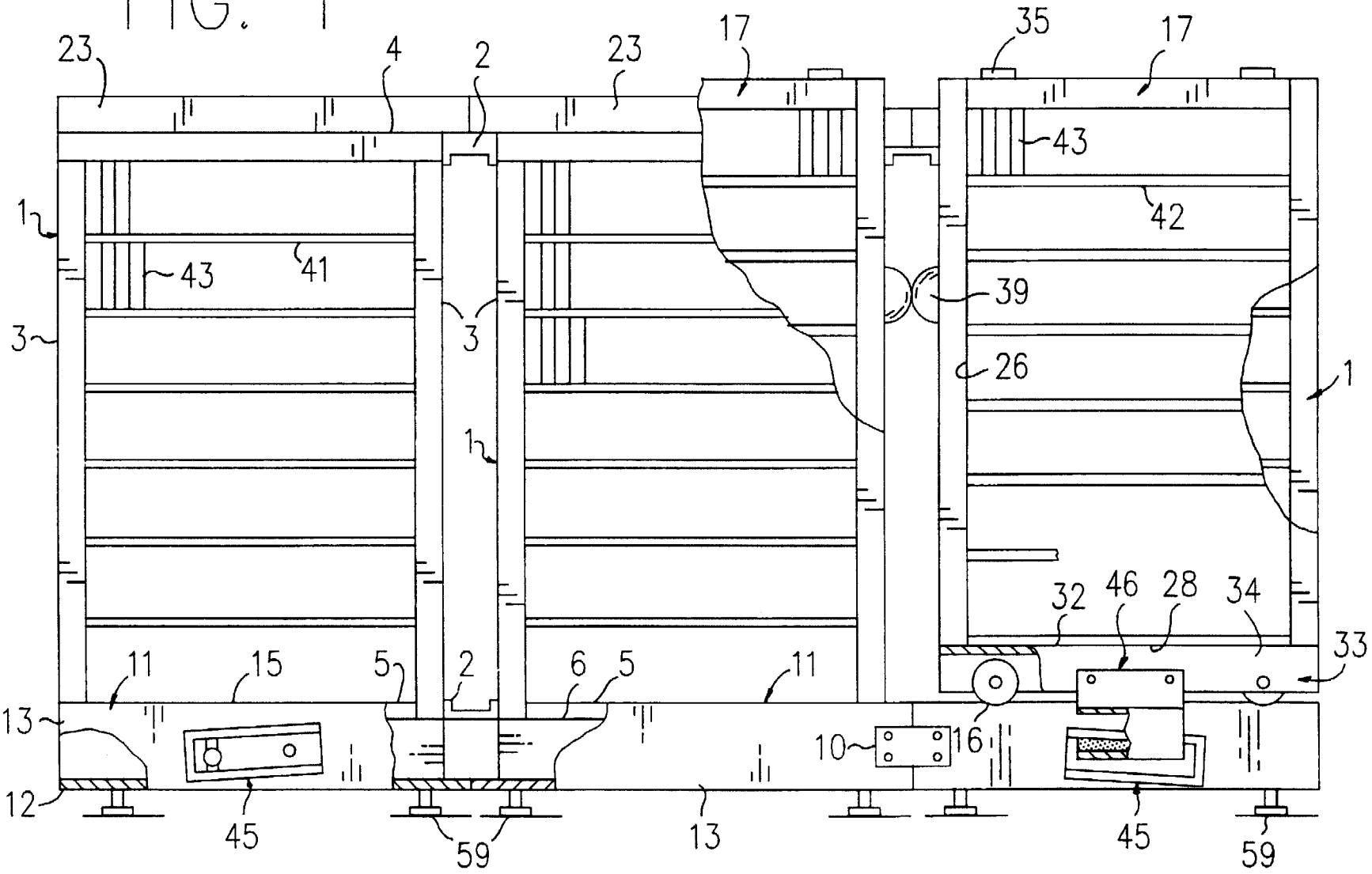
FIG. 1 is a front elevation view of an extended row of a multiple number of stationary cartridge storage racks connected in end-to-end relation, together with cartridge storage slide racks mounted for sliding movement relative to the stationary racks.

Reference is now directed to the accompanying drawings wherein the invention is shown as applied to existing stationary cartridge storage racks 1 of a conventional type. The racks have been assembled in a row; and have been connected end-to-end by spacers 2 screw fastened between upper and lower opposed sides of walls 3 of neighboring racks. Each rack is of rectangular form, having opposed side walls 3, a top wall 4 and a bottom wall 5. The bottom wall is supported upon a base 6 having a rearwardly extending width greater than that of the rack so as to provide a shoulder 7 (FIG. 3) fronting the rack and a shoulder 8 along its rear.

Mounted to and extending for the length of a lower area of the row of connected racks is a roller engageable rail track assembly. It comprises individual rail track units 11, a separate one of which fronts each rack and is connected in end-to-end abutment with the adjoining units. Each unit is of channel form. It has a bottom wall 12, a vertical front wall 13 and a rearwardly extending top wall 14. The top wall has along its front edge a narrow raised portion defining an elongated rail track 15 for riding thereon peripherally grooved rollers 16 mounted to the underside of a slide rack 17. A rear portion of the top wall 14 rests upon the shoulder 7 of the base 6. A pair of L-straps 18, fixed upon opposite end areas of the top wall 14, have upright rear portions 19 screw fastened to the lower front areas of the side walls 3 of a stationary rack. Each rail track unit 11 corresponds to the length of a stationary rack plus one-half the space separating the racks from each other by the spacers 2 so as to abut the rail track unit fronting the neighboring rack. Each track unit is secured against endwise separation from a neighboring unit by a plate 10 mounted to the front walls 13 of the neighboring units.

Figure 2:
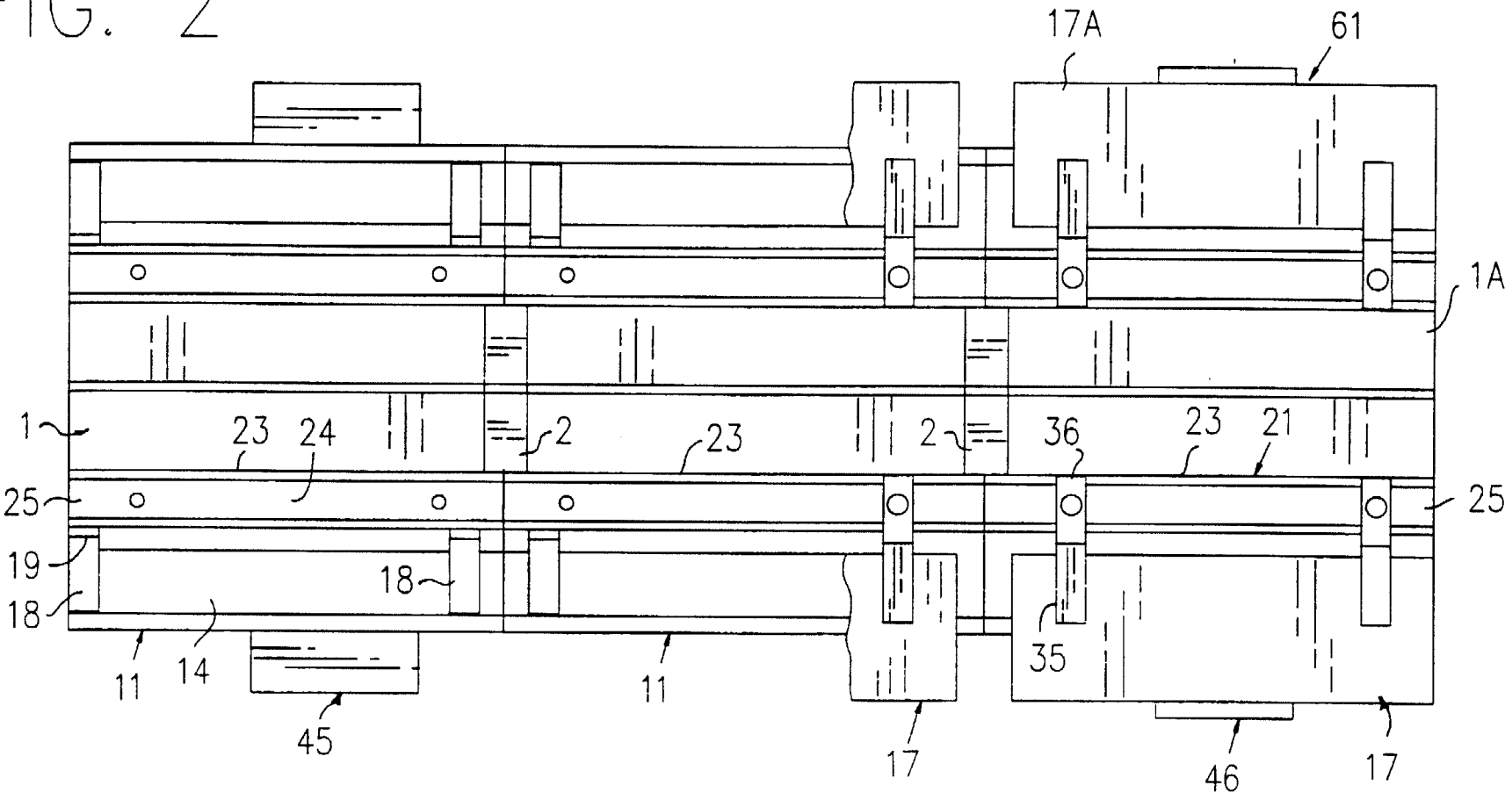
FIG. 2 is a top plan view of FIG. 1; it shows a double row of the stationary racks arranged back to back, together with slide racks that are slidable relative to the front and back rows of stationary racks.

A roller channel track assembly 21 for rolling engagement thereon of rollers 22 carried at the upper end of the slide rack 17 is removably fastened atop the stationary racks. The assembly comprises individual track units 23 connected in end-to-end abutment, each unit being screw fastened atop a separate stationary rack. The several connected track units form a continuous channel or track 24 that is open (FIG. 2) along its top and at its ends 25 for reception therein and travel of the rollers 22 carried by the slide rack.

The slide rack 17 is mounted by means of the upper and lower roller elements 22, 16 for sliding movement along the channel track 24 and the rail track 15 in parallel relation to the front of the assembly of stationary racks. The slide rack has a rectangular frame comprising opposed vertical side walls 26, a top wall 27 and a bottom wall 28. The bottom wall is fastened upon the back 32 of a downwardly opening U-channel member 33. The channel member serves as a carriage for a pair of peripherally grooved rollers 16. The rollers are bearingly supported in forward and rear areas of the channel upon shafts supported between depending side walls 34 of the channel member. The rollers serve to support the lower end of the slide rack for travel along the rail track 15.

A pair of straps 35, fastened upon opposite end areas of the top wall 27 of the slide rack, have stepped down portions 36. Portions 36 extend rearwardly away from the slide rack and overhang the open top of the channel track 24 that is mounted atop the stationary racks. Shafts depending from the undersides of strap portions 36 carry bearing rollers 22. The rollers are located in the channel track and are adapted to ride along the opposed side walls of the track.

Here, the slide rack is a conventional or existing type of a stationary cartridge storage rack to the bottom of which the U-channel member 33 carrying the rollers 16 has been mounted, and to the top of which the straps 35 carrying the rollers 22 have been mounted, so as to convert what was a stationary rack into a slide rack.

As earlier mentioned, the channel track is open along its top and at its ends 25. This is of decided advantage in that it enables quick assembly to or removal of a slide rack from the stationary racks. In assembling a slide rack to the stationary racks, the slide rack is positioned with its upper and lower rollers 22 and 16 respectively in alignment with an open end 25 of the channel track and with the rail track 15. The slide rack is then moved to enter the upper rollers through the open end 25 into the channel track and to engage the lower rollers 16 upon the rail track.

The mounted slide rack is manually slidable along the tracks in parallel closely spaced relation to the stationary racks. The number of stationary racks in an assembly may be extended as needed and in accordance with the size of a room; and the number of slide racks that may be associated with the stationary racks is optional. It may be one or more, but less than the number of stationary racks. Here, two slide racks are shown fronting the stationary racks. A slide rack may be of a length equal to or less than that of a stationary rack in the assembly. In either case, the contents of a stationary rack will be fully exposed as to its contents upon relative sliding of a slide rack.

The slide racks are adapted to be manually moved along the tracks. To facilitate insertion of one's hand between adjoining racks for this purpose, spacer bumpers 39 (FIG. 1) are mounted to opposed side walls 26 of the racks. The bumpers serve to limit the extent of movement of one slide rack relative to a neighboring slide rack so as to provide a space between them for insertion of one's hand. The bumpers are of rubber and also serve to soften possible impacting of one slide rack against another during use. The space resulting from the bumpers is equal to or less than that provided by the spacers 2 between the stationary racks, so that when a sliderack is moved relative to a stationary rack it will upon coming to a rest be fully clear of the front area of an uncovered stationary rack.

The stationary and slide racks are respectively provided with shelves 41, 42, spaced one above the other and adapted to have stored thereon computer cartridges 43, particularly cartridges known in the trade by number 3480.

The rollers by which the slide rack is supported for travel are bearing mounted, so that travel of a slide rack along the tracks is smooth and requires nominal manual effort to slide the rack. To avoid overtravel of an easy rolling slide rack relative to an end of the tracks, a brake unit is provided (FIGS. 1, 3–5). It comprises a stop member 45, and a brake pad member 46 which is adapted to be moved into friction engagement with the stop member to effect stopping of the slide rack.

The brake pad member is a bracket substantially of L-form. It has a vertical flange 47 bolted to an outer wall 34 of the U-channel member 33 of a slide rack. Flange 47 depends downward, and at its bottom is a rearwardly extending horizontal flange 48 upon the inner surface of which a brake pad 49 is fixed.

The stop member 45 is a bracket of U-form. It has a back wall 40 mounted by screws 51, 52 to a front wall 13 of a rail track unit 11. Screw 51 passes through a vertical slot 53, so that upon loosening both screws the stop member may be adjustably pivoted to obtain a desirable angle inclination of an upper flange 54 thereof for effective braking engagement of the flange by the brake pad 49. The adjustment may then be fixed by tightening both screws. As insurance against any possible upward "creeping" of the stop member about its screw supports, a screw 55 may be added, as appears in FIGS. 4, 5, to the stop member. It is adjustably threadable up through a bottom wall of the stop member to an enlarged head 56 of screw 51. A stop member is preferably located at each end of a row of stationary racks for braking engagement with a brake pad member carried by a slide rack moving in that direction.

The engagement of the brake pad member with the stop member in a braking action is progressive and smooth, so that not only is the slide member effectively stopped against overtravel but is also held down by the engaged brake members whereby it is restrained against any possibility of "jumping" from the rail track.

Further, the stop member has an end wall 57 upon the inner surface of which is a resilient pad 58, which acts as a cushion to mitigate any impact that might occur upon overtravel of the brake pad member.

While the brake unit, comprising members 45 and 46 is shown as applied to effect braking of a slidable rack against overtravel relative to a stationary rack, it may also be applied to other assemblies having a component that is slidable relative to a stationary component.

Leveler foot screws 59, threaded at appropriate points in the undersides of the entire assembly of stationary and slide racks, are adjustable to obtain a level condition of the entire assembly. This is desired to avoid any inclined condition of the assembly that might cause undesirable loose rolling of a slide rack along the tracks.

To further utilize limited room space for accomodating cartridge storable racks, the base member 6 of the assembly extends, as by the shoulder 8, rearwardly sufficiently to have mounted thereon a duplicate assembly 61 of stationary and slide racks 1A, 17A, as described, in which the stationary racks 1, 1A are supported upon the common base 6 back to back.

While an embodiment of the invention has been illustrated and described in detail, it is to be expressly understood that the invention is not limited thereto, and it is my intent, therefore, to claim the invention not only as shown and described but also in all such forms and modifications thereof as may be reasonably construed to fall within the spirit of the invention and the scope of the appended claims.

What is claimed is:

1. An extendable assembly of cartridge storage stationary racks and a cartridge storage slide rack that is slidable relative to the stationary racks, the assembly comprising: multiple stationary racks, removable brackets connecting the stationary racks in end-to-end relation, a roller engageable channel track mounted along a top wall of each stationary rack in end-to-end abutting relation with similar tracks mounted along the top walls of neighboring stationary racks, each track being open along its top and at its ends to provide a continuous channel track with adjoining tracks; a separate base upon which each stationary rack is individually mounted, each base having a shoulder extending along a front of the rack mounted upon the base and having a shoulder extending along a rear of the rack; a separate rail track unit supported upon the shoulder fronting each stationary rack, each rail track unit having a front wall and a top wall extending rearwardly from the front wall, means securing the top wall to the stationary rack, the top wall having a narrow raised portion extending along a front edge thereof, and means connecting the rail track units end-to-end whereby the narrow raised portions of the several units provide a continuous rail track fronting the stationary racks; a cartridge storage slidable rack unit comprising a slide rack for the storage thereon of cartridges, peripherally grooved rollers mounted to a bottom wall of the slide rack engaged for rolling along the rail track, and strap elements extending rearwardly from a top wall of the slide rack supporting rollers depending into the channel track, whereby the cartridge storage slidable rack unit is slidable along the rail and channel tracks, and whereby the assembly is adapted to have additional slidable cartridge storage rack units added to it by entering the depending rollers of the additional rack units into the channel track through an open end of the channel track and by seating the peripherally grooved rollers of the additional rack units onto the rail track.

2. An extendable assembly as in claim 1, wherein the assembly is adapted to have additional stationary cartridge storage racks, together with associated channel tracks, bases and rail track units joined in extension of corresponding elements in the manner set forth in claim 1.

3. An extendable assembly as in claim 1, wherein rubber bumpers are mounted upon opposed end walls of the slidable cartridge storage rack units, the bumpers serving to soften impact of one of the slidable cartridge storage rack units relative to another in the event of overtravel of a unit, and the bumpers further serving to effect a space between neighboring slidable cartridge storage rack units allowing insertion into the space of a worker's hand for manually sliding one of the units along the tracks.

4. An extendable assembly as in claim 1, wherein the bases supporting the stationary racks extend rearwardly of the stationary racks, and a duplicate of the assembly is mounted upon the extended bases.

5. An extendable assembly as in claim 1, wherein the assembly includes a brake member carried by the slidable cartridge storage rack unit and a stop member mounted to a stationary rack, the brake member having a padded flange and the stop member having a flange with which a pad of the padded flange is frictionally engageable to brake the slidable rack unit against movement beyond a predetermined distance.

6. An assembly comprising a row of cartridge storage stationary racks *including upper and lower wall areas*;

roller engageable track means mounted in end-to-end relation to *both* upper and lower wall areas of the stationary racks;

a slidable cartridge storage rack carrying rollers engaged with the track means and slidable by means of the rollers along the track means relative to the stationary racks;

and brake means carried by the slidable rack having a padded flange adapted for frictional cooperation with a flange of a stop member mounted to a stationary rack to effect stopping of travel of the slidable rack beyond a predetermined distance.

7. An assembly as in claim 6, wherein means is provided for extending the assembly to include additional stationary racks and complementary roller engageable track means.

8. In an assembly including an elongated stationary unit and a slidable unit fronting the stationary unit and slidable relative to the stationary unit, means for braking movement of the slidable unit beyond a predetermined distance relative to the stationary unit, the braking means comprising: a stop member of U-form having a back wall mounted to an end area of the stationary unit and having a longitudinally extending flat upper wall; and a brake pad member having a vertical wall mounted to the slidable unit, the vertical wall terminated at a bottom end thereof in a longitudinally extending flat flange upon an inner face of which a brake pad is mounted, wherein the brake pad is adapted to obtain friction engagement with the longitudinally extending flat upper wall of the stop member upon the slidable unit moving a predetermined distance relative to the stationary unit and in doing so to stop further movement of the slidable unit.

9. A method for forming an extendable row of cartridge storage stationary racks and associated cartridge storage slidable racks that are slidable along a pair of tracks relative to the stationary racks, the method comprising: providing a first individual cartridge storage stationary rack; fastening a spacer element to an end wall of the stationary rack and also fastening the said spacer element to an opposed end wall of a succeeding second stationary rack; similarly fastening spacer elements to extend the second stationary rack with successive additional stationary racks; mounting along an upper front area of each of the stationary racks an open ended roller engageable channel track of a length to abut an open end of a next adjoining channel track so as to form a continuous channel track along the stationary racks; mounting along a base front of each stationary rack a roller engageable rail track of a length to abut an end of a next adjoining rail track so as to form a continuous rail track along the stationary racks parallel to the continuous channel track; providing one or more individual cartridge storage slidable racks; engaging for travel along the continuous channel track rollers extending off the upper back of each slidable rack; and engaging for travel along the continuous rail track peripherally grooved rollers mounted to the underside of each slidable rack.

* * * * *